United States Patent
Imbornone et al.

(10) Patent No.: US 11,624,405 B1
(45) Date of Patent: Apr. 11, 2023

(54) BEARING HOUSING AND BEARING SUBASSEMBLY FOR USE IN SIDE CHANNEL BLOWER AND SIDE CHANNEL BLOWER EMPLOYING SAME

(71) Applicant: AIRTECH GROUP, INC., Rutherford, NJ (US)

(72) Inventors: Vincent Imbornone, Union, NJ (US); Raphael Sagher, Alpine, NJ (US)

(73) Assignee: AIRTECH GROUP, INC., Rutherford, NJ (US)

( * ) Notice: Subject to any disclaimer, the term of this patent is extended or adjusted under 35 U.S.C. 154(b) by 257 days.

(21) Appl. No.: 16/909,403

(22) Filed: Jun. 23, 2020

(51) Int. Cl.
| | |
|---|---|
| F16C 35/067 | (2006.01) |
| F04D 29/056 | (2006.01) |
| F04D 29/08 | (2006.01) |
| F16C 35/04 | (2006.01) |
| F04D 29/18 | (2006.01) |
| F16C 23/06 | (2006.01) |

(52) U.S. Cl.
CPC .......... *F16C 35/067* (2013.01); *F04D 29/056* (2013.01); *F04D 29/083* (2013.01); *F16C 35/042* (2013.01); *F04D 29/188* (2013.01); *F05D 2240/50* (2013.01); *F05D 2240/55* (2013.01); *F16C 23/06* (2013.01)

(58) Field of Classification Search
CPC ...... F04D 29/05; F04D 29/056; F04D 29/059; F04D 29/083; F04D 29/188; F04D 29/622; F04D 29/642; F16C 23/06; F16C 35/042; F16C 35/067; F16C 35/077; F05D 2240/50; F05D 2240/55
See application file for complete search history.

(56) References Cited

U.S. PATENT DOCUMENTS

| | | | |
|---|---|---|---|
| 3,951,567 A | 4/1976 | Rohs | |
| 9,303,645 B2 | 4/2016 | Oakman | |
| 9,303,687 B1 * | 4/2016 | Wiseman | ................ F16C 35/07 |
| 2012/0219403 A1 * | 8/2012 | Riley | .................... F04D 29/061 |
| | | | 415/170.1 |
| 2018/0202447 A1 * | 7/2018 | Dittmar | ................. F04D 29/188 |

FOREIGN PATENT DOCUMENTS

EP    1837527 B1    1/2009

* cited by examiner

*Primary Examiner* — Woody A Lee, Jr.
*Assistant Examiner* — Elton K Wong
(74) *Attorney, Agent, or Firm* — Thomas M. Galgano; Galgano IP Law PLLC

(57) ABSTRACT

The invention relates to a threaded bearing housing and a side channel blower incorporating the same wherein the threaded bearing housing is installed on the outer casing element of the side channel blower. The bearing housing supports the outer ring of the blower's bearing. The bearing housing location is adjustable radially and along the axial axis of the side channel blower. These adjustments provide a variable positioning of the rotating components of the side channel blower. This adjustment reduces the necessary assembly tolerancing and allows the impeller's blade and the channel between the casing elements in which it rotates to be properly spaced apart for easy and facile installation and efficient operation.

14 Claims, 5 Drawing Sheets

BEARING HOUSING AND BEARING SUBASSEMBLY FOR USE IN SIDE CHANNEL BLOWER AND SIDE CHANNEL BLOWER EMPLOYING SAME

BACKGROUND OF THE INVENTION

1. Field of the Invention

The invention relates to the field of bearing assemblies for side channel blowers and side channel blowers incorporating said bearing housing assemblies therein. More particularly, it pertains to a threaded bearing housing which affords easy and facile adjustment of the clearance between the impeller blades and the housing. The threaded bearing housing acts as a seat for the bearing connected to the blower's drive shaft which rotates the impeller. By adjusting the distance of the seat, the gap between the blades and the housing changes proportionally. This reduces the impact of the conventional machining and assembly tolerances and allows for an easier and facile adjustment of the axial height of the bearing seat to, in turn, achieve proper and effective spacing of the moving blades of the impeller and the blower housing for efficient operation of the blower.

2. Description of Prior Art

In the assembly of conventional side channel blowers, the rotating components are secured on a drive shaft for rotation about the axial or longitudinal axis thereof, which, in turn, is rotatably coupled to the drive shaft of the motor of the unit. The blower side end of the drive shaft is fixed to the inner ring of a bearing whose outer ring is connected to the blower's housing. The location of the bearing seat therefore defines the axial position of the entire rotatable assembly relative to the blower housing and its inner hollow channel or chamber in which the impeller rotates. As the shaft rotates, the impeller follows, and its blades carry air through the toroidal or circular side channel, located in the housing. The distance between the blades and the channel is critical since contact would damage the surface of both or, if the distance apart is too large, the efficiency of the blower would be reduced. Thus, in conjunction with other factors, the blower's efficiency relies on the impeller's location in the channel.

Presently, the assembly of side channel blowers and the location of the impeller is dependent on the assembly or machining tolerancing of its parts. In other words, as the sum of the tolerances or set spacings of the various blower parts add or stack up at final assembly, there is a risk of noncompliance, i.e., inadequate spacing in the final assembled blowers, which may cause damage to the contacting surfaces or reduced performance if too great a spacing. Obviously, proper tolerancing can avoid such outcomes. However, tight tolerances can also be impractical and unduly increase the production cost.

Currently, during the assembly of the parts of the side channel blowers, if the tolerances of the impeller's blade with the side channel blower housing are inadequate, and contact occurs between surfaces of the impeller and blower housing, the assembler corrects the situation with shims at the bearing seat. The shims are installed in between the housing and the bearing. The shims, typically flat, thin rings, are usually of the same diameter as the bearing outer race and simply slide in position axially before being compressed by the bearing surfaces. However, the adjustment of the shims can be time consuming and irregular. The installation of the shims is often completed by trial error and requires removing the housing at every trial or iteration.

Accordingly, it is an object of the present invention to provide a novel bearing housing for a side channel blower and a side channel blower having such a novel bearing housing which are simple and efficient in operation, which eliminate the use of shims, and are axially self-adjustable.

It is a more particular object of the present invention to provide a side channel blower which is less dependent on the axial tolerances of the assembled parts thereof by providing an adjustable threaded bearing housing.

It is a more particular object of the present invention to provide such a novel threaded bearing housing for a side channel blower which is easy and facile to install and use and which further reduces the cost and time of assembly and optimizes efficient manufacture, assembly and operation of the side channel blower.

SUMMARY OF THE INVENTION

Certain of the foregoing and related objects are readily obtained by the provision of a bearing housing for a regenerative side channel blower of the type having a blower housing having an internal cavity formed therein defining a toroidal flow channel for a fluid, an impeller having blades rotatably mounted in said internal cavity of said blower housing, and a drive shaft rotatably mounted in said blower housing on which said impeller is mounted for rotation therewith about a longitudinal axis of said drive shaft. The bearing housing comprises a bearing housing assembly for axially supporting said impeller in an adjustable manner comprising a bearing housing and a bearing mounted in said bearing housing, said bearing housing being adjustably mountable in the blower housing to allow for an axial depth adjustment of the position of the impeller relative to the blower housing to, in turn, adjust the clearance between the impeller and the blower housing.

Preferably, the regenerative side channel blower is of the type further having a blower housing with a threaded portion, and said bearing housing preferably has a threaded portion rotatably and threadably engageable with the threaded portion of the blower housing to allow for said axial depth adjustment via rotational adjustment of said threaded portion of said bearing housing relative to the threaded portion of the blower housing. Desirably, the regenerative side channel blower is of the type wherein the blower housing comprises an outer casing and an inner casing removably coupled to one another, which together cooperatively define the internal cavity of the blower housing, and wherein the outer casing has a cylindrical rim defining a central circular opening extending through the outer casing, which cylindrical rim has the threaded portion of the casing formed thereon. The bearing housing is most desirably mountable on the outer casing via said threaded portion thereof being threadably engageable with the threaded portion of the cylindrical rim. Advantageously, said bearing housing is generally cup-shaped and has a closed end and an opposite open end, and a generally cylindrical sidewall having a first end secured to said closed end and a second end defining said open end thereof. The sidewall advantageously has an outer surface with said threaded portion of said bearing housing being formed thereon adjacent to said closed end thereof.

In a preferred embodiment of the invention, the regenerative side channel blower is of the type wherein a plurality of spaced-apart, semi-circular cut-outs are formed in the threaded portion of the outer casing cylindrical rim. The bearing housing is also provided with a plurality of spaced-apart, semicircular cut-outs in said threaded portion formed therein which are alignable with the cut-outs of the blower housing cylindrical rim so together they form a plurality of cylindrical slots. Most desirably, the bearing housing additionally includes a plurality of cylindrical locking pins, each insertable into one of said cylindrical slots to fix the radial orientation and longitudinal axial position of said bearing housing relative to the outer casing of the blower housing.

In a particularly preferred embodiment of the invention, the regenerative side channel blower is of the type wherein the cut-outs in the cylindrical rim are equidistantly spaced about the circumference of the cylindrical rim of the blower housing and wherein said cut-outs of said bearing housing are equidistantly spaced about said threaded portion of said bearing housing to effect alignment of said cut-outs of said bearing housing with the blower housing cut-outs. In addition, said bearing housing sidewall has a circumferentially-extending, generally U-shaped channel opening onto said outer surface thereof formed adjacent to, but spaced from, said threaded portion thereof. An O-ring is received in said U-shaped channel of said bearing housing sidewall to provide an airtight coupling of the outer casing rim and the bearing housing sidewall. Most advantageously, said bearing is disposed within said cup-shaped bearing housing adjacent to said basewall thereof. The bearing has a cylindrical outer ring and a cylindrical inner ring. The inner ring is couplable to the drive shaft for rotation therewith and said outer ring is couplable to said bearing housing.

Certain of the foregoing and related objects are also attained in a regenerative side channel blower comprising a blower housing having an internal cavity formed therein defining a toroidal flow channel for a fluid; an impeller having blades rotatably mounted in said internal cavity of said blower housing; a drive shaft rotatably mounted in said blower housing on which said impeller is mounted for rotation therewith about a longitudinal axis of said drive shaft; and a bearing housing assembly for axially supporting said impeller in an adjustable manner, comprising a bearing housing and a bearing mounted in said bearing housing. The bearing housing is adjustably mounted in said blower housing to allow for an axial depth adjustment of the position of the impeller to, in turn, adjust the clearance between the impeller and the blower housing. Preferably, said blower housing and said bearing housing each having a threaded portion rotatably engageable with one another to allow for said axial depth adjustment via rotational adjustment of said threaded portions relative to one another.

Desirably, said blower housing comprises an outer casing and an inner casing removably coupled to one another which together cooperatively define said internal cavity of said blower housing, and said outer casing has a cylindrical rim defining a central circular opening extending through said outer casing, said cylindrical rim having said threaded portion of said casing formed thereon. Advantageously, said bearing housing is generally cup-shaped and has a closed end and an opposite open end, and a cylindrical sidewall having a first end secured to said closed end and a second end defining said open end, with said sidewall having an outer surface with said threaded portion of said bearing housing being formed therein adjacent to said closed end thereof. Most desirably, said bearing housing sidewall has a plurality of spaced-apart, semicircular cut-outs formed in said threaded portion thereof and wherein said outer casing cylindrical rim has a plurality of spaced-apart, semicircular cut-outs formed in said threaded portion thereof which are alignable with said cut-outs of said bearing housing sidewall so together they form a plurality of cylindrical slots. A plurality of cylindrical locking pins are provided, each of which is insertable into one of said cylindrical slots to fix the radial orientation and axial position of said bearing housing relative to said outer casing. Most advantageously, said cut-outs are equidistantly spaced about the circumference of said cylindrical sidewall of said bearing housing and said cylindrical rim of said outer casing to permit alignment of said cut-outs thereof.

In a particular preferred embodiment, said blower housing sidewall has a circumferentially-extending, generally U-shaped channel opening onto said outer surface thereof formed adjacent to, but spaced from, said threaded portion thereof and an O-ring received in said channel of said bearing housing sidewall. The bearing is preferably disposed within said cup-shaped bearing housing adjacent to said basewall thereof. The roller bearing has a cylindrical outer ring and inner ring, with said inner ring being coupled to said shaft for rotation therewith and said outer ring being coupled to said bearing housing.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention. In the drawings.

DETAILED DESCRIPTION OF THE PREFERRED AND ILLUSTRATED EMBODIMENT

Figure 1:
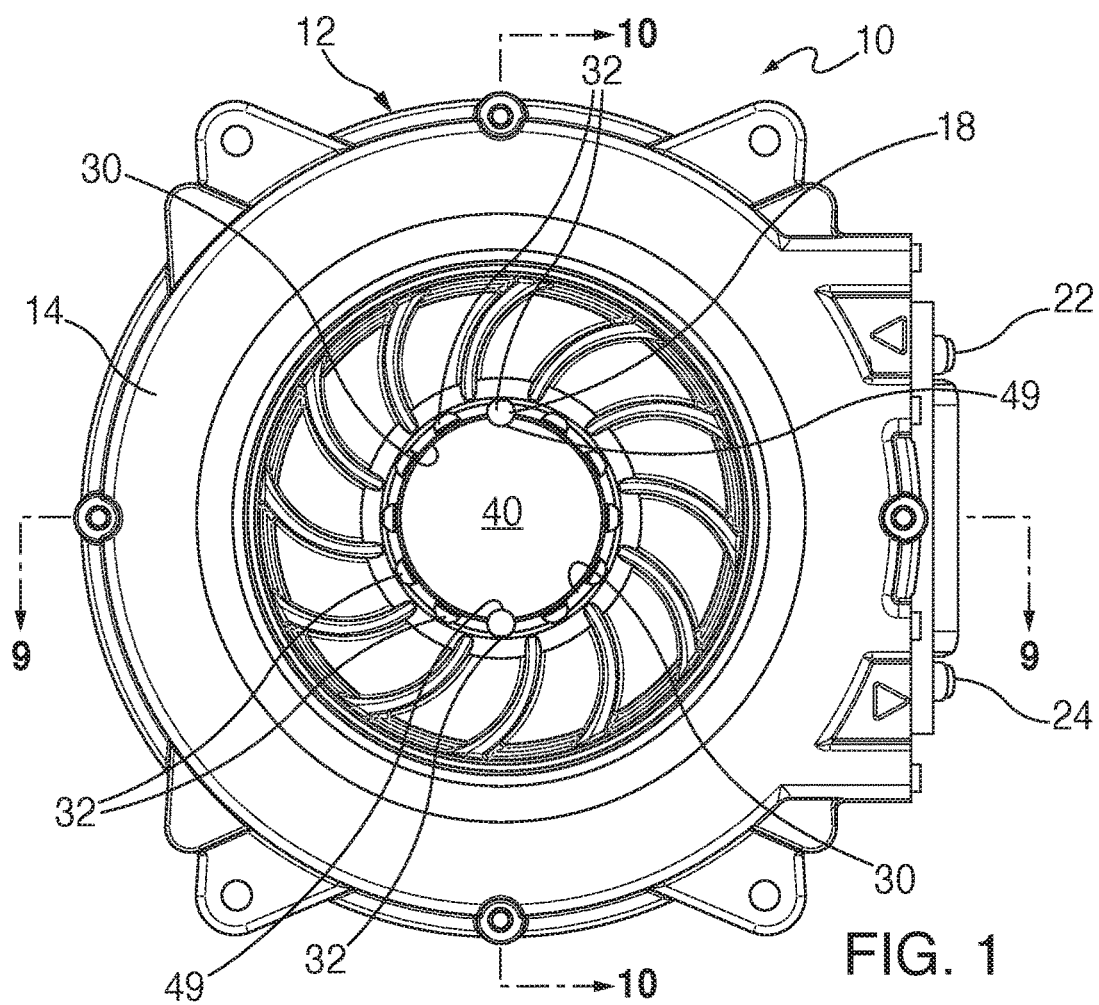
FIG. 1 is a top plan view of a novel threaded bearing assembly embodying the present invention mounted at the center of an outer casing element of a novel side channel blower.

Turning now in detail to the drawings and, in particular, FIGS. 1-4 thereof, therein illustrated is a regenerative side channel blower 10 embodying the present invention which includes a split, annular housing assembly 12 composed of two casings or housings-namely an outer casing 14 and a motor-side casing 16. As seen best in the exploded view of FIG. 3, casings 14 and 16 are intended to be rigidly affixed to each other, typically by fasteners, preferably in the form of threaded bolts 15 threadably received in cylindrical studs 13 having aligned threaded bores in both casings 14 and 16, in which the bolts 15 are threadably coupled, as is well known in the art. A motor (not shown), typically an electric motor, is mounted on the center of the motor side casing 16. The end of the drive shaft 17 of the motor projects through the center hub 18 of impeller 19 where it is coupled thereto, optionally, e.g., via a key (not shown) to rotate impeller 19. The casings 14, 16 when coupled also define a flanged inlet port 22 and a flanged outlet port 24, the position of which is highlighted by raised triangular arrows on outer casing 14. Outer casings 14, 16, each have inner cavity surfaces configured to define a toroidal flow channel 26 in which impeller 28 is disposed and rotatably mounted so as to rotate around the axial or longitudinal axis of the blower assembly 10.

Figure 2:
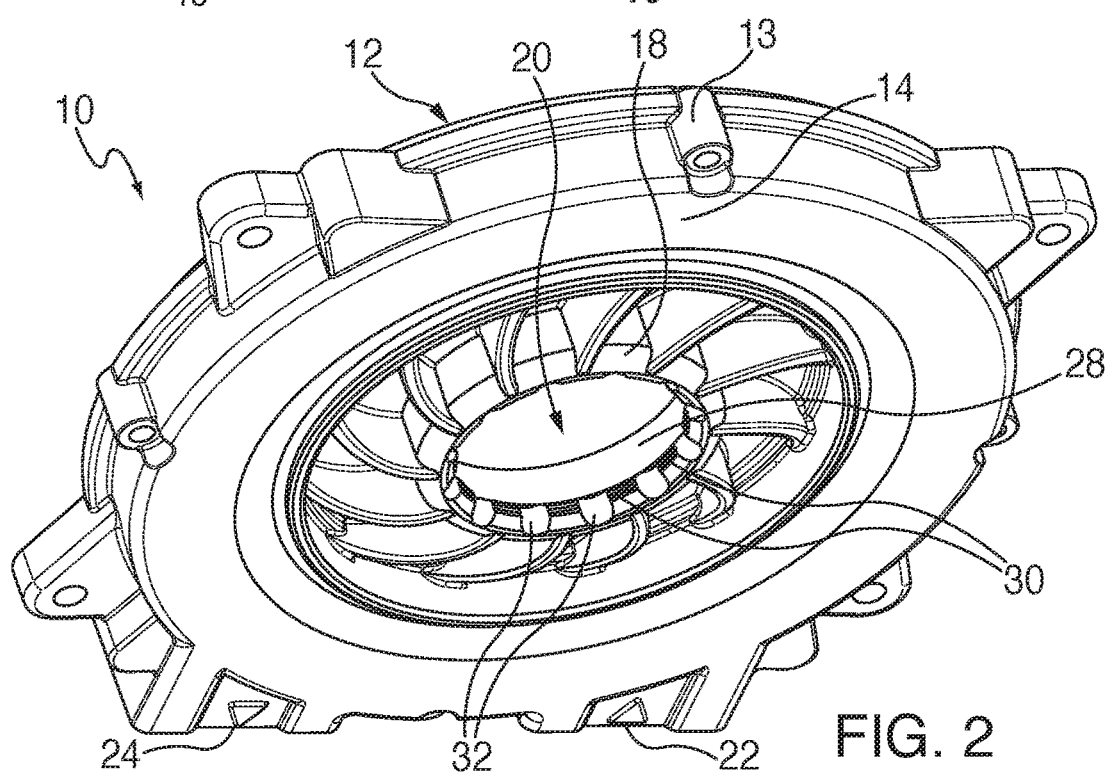
FIG. 2 is a top and side perspective view of the novel side channel blower shown in FIG. 1 with the threaded bearing assembly removed to show the location on the outer casing where the threaded bearing housing of the present invention is installed.

FIG. 2 shows outer casing 14 of the side-channel blower 10 shown in FIG. 1 without the novel threaded bearing housing to better illustrate its central circular bore 20 and its axially aligned, ring-like annular rim 28 which surrounds its central bore 20. Rim 28 has circumferentially-extending helical threads 30 formed on the radially inner half of rim 28 which are interrupted by semicircular cut-outs 32, the purpose of which is described in greater detail below.

Figure 3:
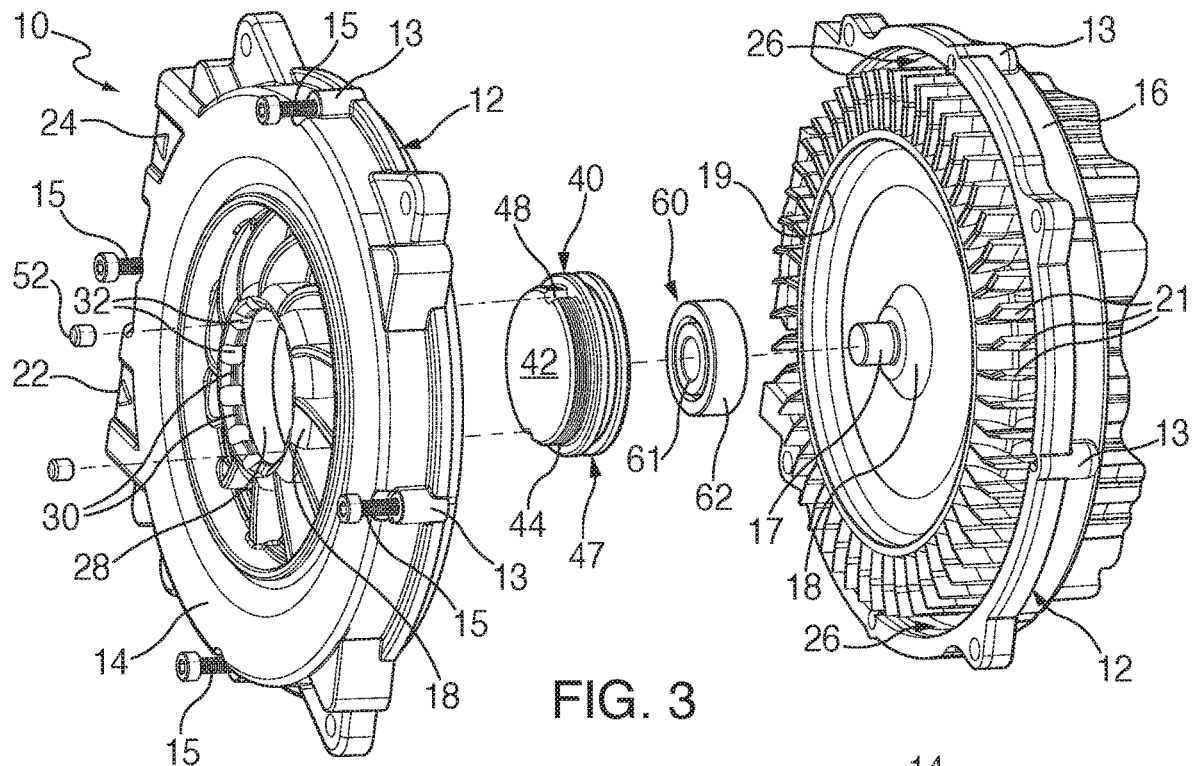
FIG. 3 is an exploded, perspective view of the novel side channel blower showing its outer casing, its inner casing and its threaded bearing housing and rotary bearing axially aligned therebetween, for mounting on the free end of the rotatable shaft of the blower.

As seen best in FIG. 3, the impeller 19 comprises a multiplicity of curved blades 21 distributed in a circumferentially spaced-apart manner around the hub 18. Impeller 19 is arranged in a toroidal side channel 26 disposed between and defined by the inner surfaces of casings 14, 16 which is configured to closely follow the contours of the impeller 19 and its blades 21. As the impeller 19 rotates, it moves the intake gas inside the side toroidal channel 26 during each revolution from the inlet port 22 to the outlet port 24.

Figure 9:
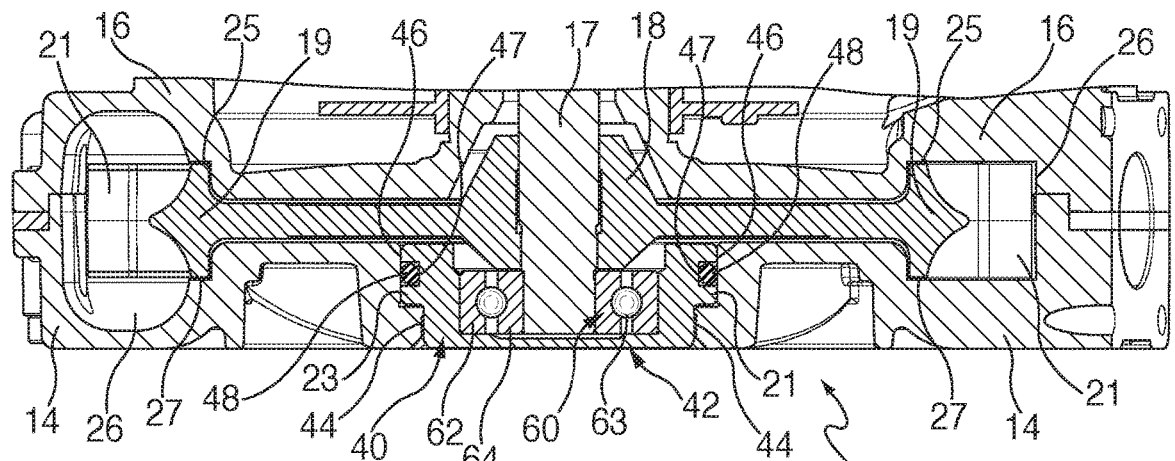
FIG. 9 is a cross-sectional view of the side channel blower taken along line 9-9 of FIG. 1.

FIGS. 5-8 illustrate the novel bearing housing of the present invention generally designated 40 which has a generally U-shaped or cup-shaped profile. In particular, it has a flat or planar basewall 42 and a generally cylindrical sidewall 43 comprising an externally-helically-threaded inner or lower portion 44 adjacent to and joined to basewall 42 and a slightly enlarged and externally-channeled outer or upper portion 46 which defines a U-shaped channel 47 and has an annular flat rim 45 which defines a central open end leading to the albeit irregular but generally U-shaped or cup-shaped cavity 41 of bearing housing 40. Since the assembly bearing housing 40 is movable for adjustment purposes during assembly it creates a break, gap, or discontinuity in the outer casing 14, was so mounted. Consequently, it is crucial to seal the gap between its upper portion 46 and casing 14 to avoid leakage between its U-shaped channel 47 and the outside environment. As seen in FIG. 9, this is accomplished by the employment of an O-ring 48 mounted in channel 47 to seal the gap between the opposed surfaces of the bearing housing 10 and outer casing 14, respectively, to effect an airtight seal when the bearing housing 40 is mounted within the central opening 20 of the outer casing 14.

Figure 4:
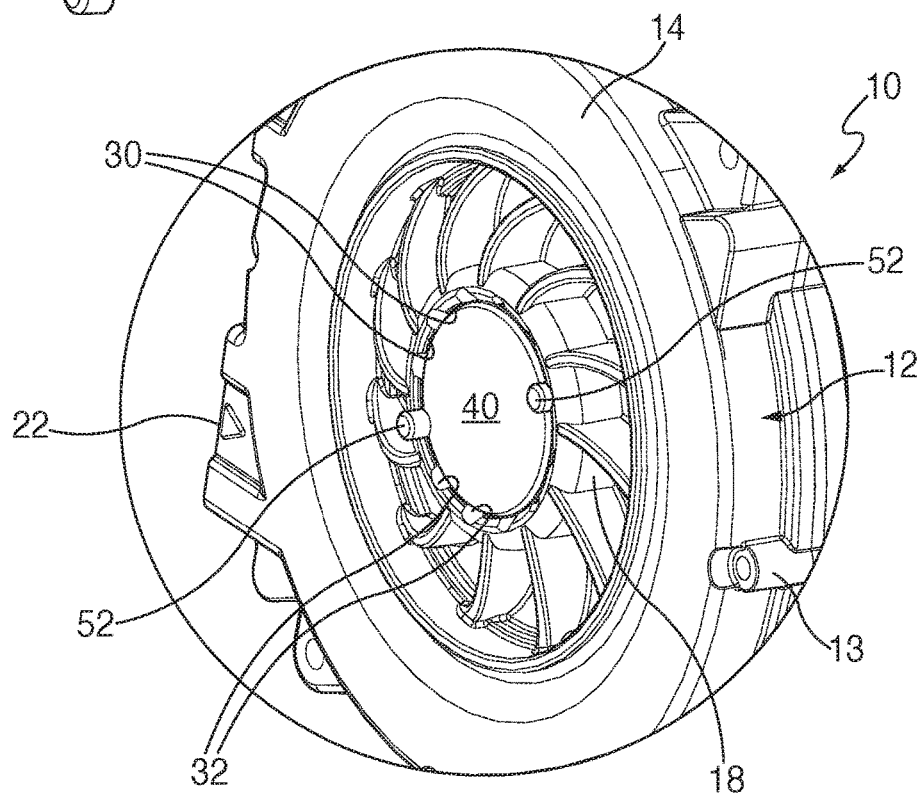
FIG. 4 is an enlarged, fragmentarily-illustrated, top and side perspective view of the side channel blower shown in FIG. 1 showing the threaded bearing housing mounted within the center hub of the blower outer casing and further showing two locking pins partially inserted into a pair of opposed holes formed by the outer casing and bearing housing.
Figure 5:
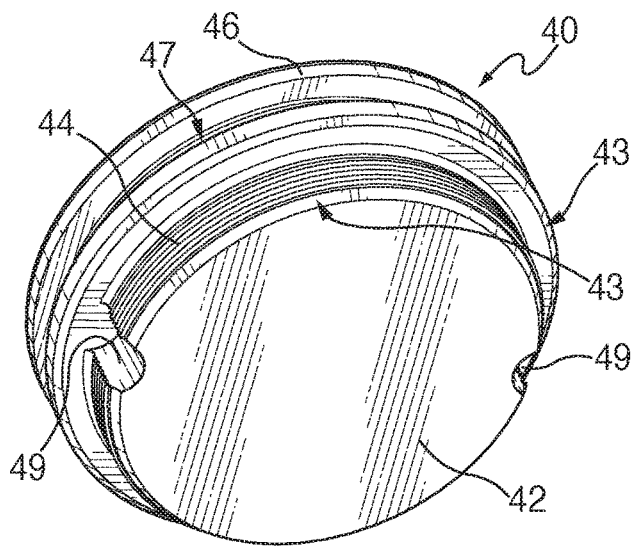
FIG. 5 is an enlarged, top and side perspective view of the threaded bearing housing shown in FIG. 1.
Figure 6:
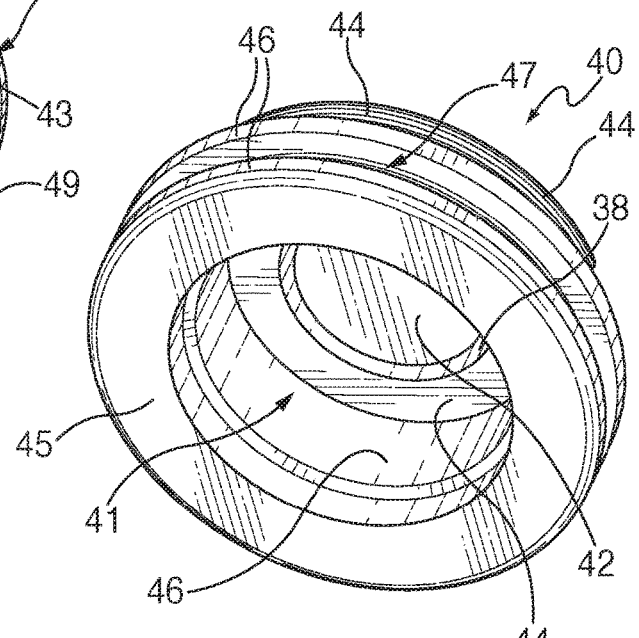
FIG. 6 is an enlarged, bottom and side perspective view of the threaded bearing housing shown in FIG. 1.
Figure 7:
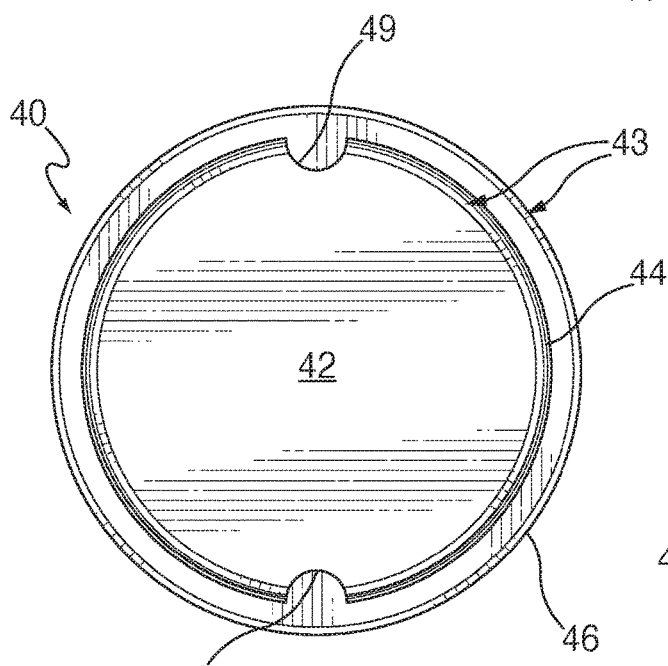
FIG. 7 is a top plan view of the threaded bearing housing shown in FIG. 1.
Figure 8:
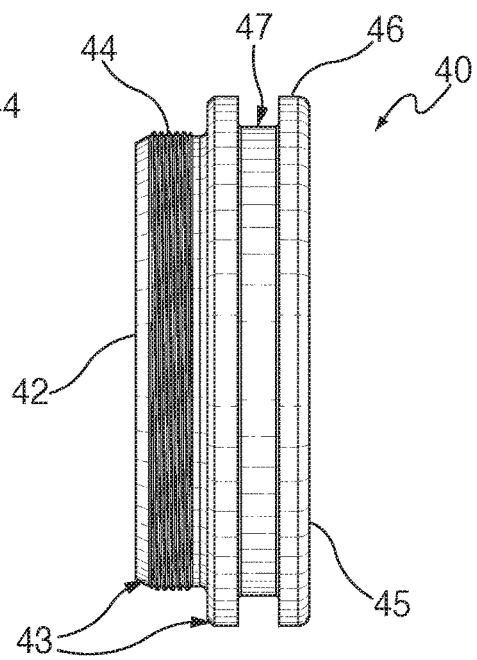
FIG. 8 is a side elevation view of the threaded bearing housing shown in FIG. 1.

As shown in FIGS. 5 and 7, the bearing housing location in casings 14, 16 is determined radially, preferably by two or more spaced-apart, semicircular location holes or cut-outs 49 in the threaded lower portion 44 of sidewall 43 which opens onto the basewall 42 of bearing housing 40. The plurality of half-circle or semicircular holes 49 (in FIG. 5 there are two holes 49) have identical dimensions and are preferably equidistantly spaced about the sidewall 43 and basewall 42 of bearing housing 40. In addition, as seen in FIGS. 1 and 4, the annular rim 28 of outer casing 14 has identical location holes or cut-outs 32 equidistantly spaced about its periphery. As the half holes 49, 32 meet at assembly via threaded engagement of rim 28 and lower portion 44, they form a complete circle into which a cylindrical locking plug or pin 52 is inserted once the desired axial position and radial orientation of the bearing housing 40 is obtained. Thus, as a result, the threaded bearing housing's radial orientation and axial position is fixed and locked against rotation or further movement during operation of the blower.

As illustrated in FIG. 9, impeller 19 is disposed at the axial center of the two casings 14, 16 and is rotatable about its central hub 18 with its axial axis of rotation being positioned at the center of the axial bore 20 whose axis defines the axial axis of blower 10. In order to center the bearing housing 40 inside the outer casing 14 in an optimal manner, the tolerancing is done via rotational adjustment of threaded portions 44 of the bearing housing 40 and the corresponding threaded portions 30 of rim 28 of the outer casing 14 via their threaded mating engagement. The bearing housing 40 can thus be fitted with a conventional or standard bearing 60 (e.g., a ball or roller bearing) of the blower 10 received in its cup-shaped cavity 41 adjacent its basewall 42. As illustrated, conventional bearing 60 is in the form of a flat, annular ring comprising an inner ring 62, an outer ring 64 and a ball-bearing race 63 therebetween which allows the rings 62, 64 to rotate independently of one another. Bearing 60 is generally the same diameter of the lower portion of cavity 41 of bearing housing 40 to provide a snug fit of the bearing 60 therein with its outer ring 62 fixed thereto and seated on the basewall 42 of the bearing housing 40 which serves as its axially-adjustable seat. The drive shaft end 17 is inserted into the inner circular bore of the bearing inner ring 64 so that it does not contact the bearing housing 40. Instead, a step or shallow depression 53 is provided in the basewall 42 to create a gap between the inner ring 64 and basewall 42 to avoid contact therebetween, so that the inner ring 64 is free to rotate without interference from contact with basewall 42 of housing 40. Due to this layout, the depth or height of the bearing 60 relative to the outer casing of the blower 10 can vary based on the range of axial travel of bearing housing 40 afforded by the adjustment of the threaded engagement of threaded portions 30, 44 of rim 28 and sidewall 43, respectively.

Moreover, as the impeller 19 is mounted on the shaft 17, whose position is fixed relative to the inner ring 64 of bearing 60, and as the blower's toroidal flow channel 26 is located between the outer and inner casings 14, 16, the adjustability of the axial position or displacement of the bearing housing 40 also determines the position of the blades 21 inside the side channel 26. As the depth or height of the bearing housing is adjustable as well its radial orientation, the crucial or driving tolerance of the assembly becomes the radial and axial alignment of the bearing housing which is defined by the threadably mating engagement of its threaded lower portion 44 and the threaded portion 30 of rim 38 defining central bore 20 of outer casing 14.

As a result of this arrangement, the threaded bearing assembly 40 has a threaded lower portion 44 on its sidewall 43 which can be advanced (i.e., raised or lowered) into a working position inside the rim 28 of the outer casing element 14 of a side channel blower 10, to in turn, raise or lower bearing 60 and the rotating components (e.g., impeller 19 and blades 21) inside the outer casing 14 of the side channel blower 10. At installation, the depth can be axially adjusted by screwing the bearing housing 40 into position which regulates the position of the rotating components relatively to the housing. At the same time, its threaded sidewall periphery is sealed by O-ring 48 which acts as an air-tight barrier in between the channel and the outside environment.

Figure 10A:
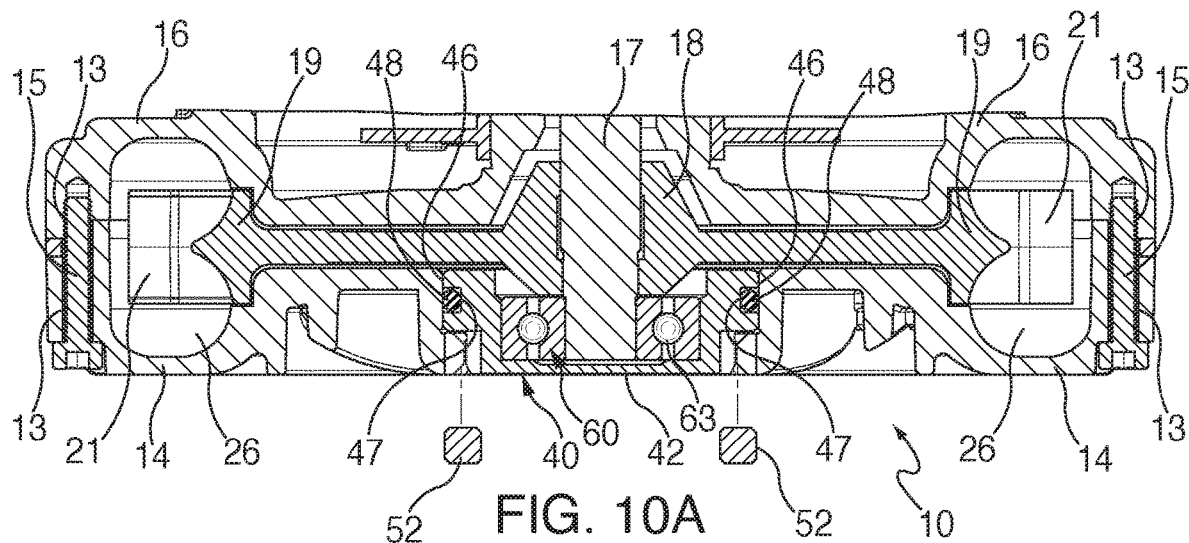
FIG. 10A is a partially-exploded, cross-sectional view of the side channel blower taken along line 10-10 of FIG. 1, further showing the locking plugs displaced therefrom prior to mounting.
Figure 10B:
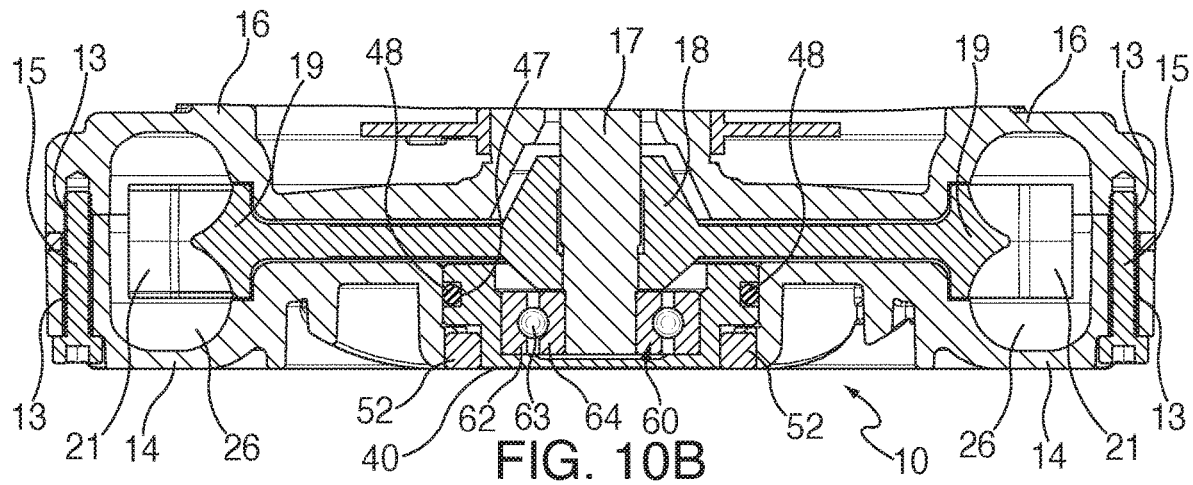
FIG. 10B is a further cross-sectional view of the side channel blower taken along line 10-10 of FIG. 1, but with the locking plugs inserted and radially and axially locking the threaded bearing housing in place.
Figure 11:
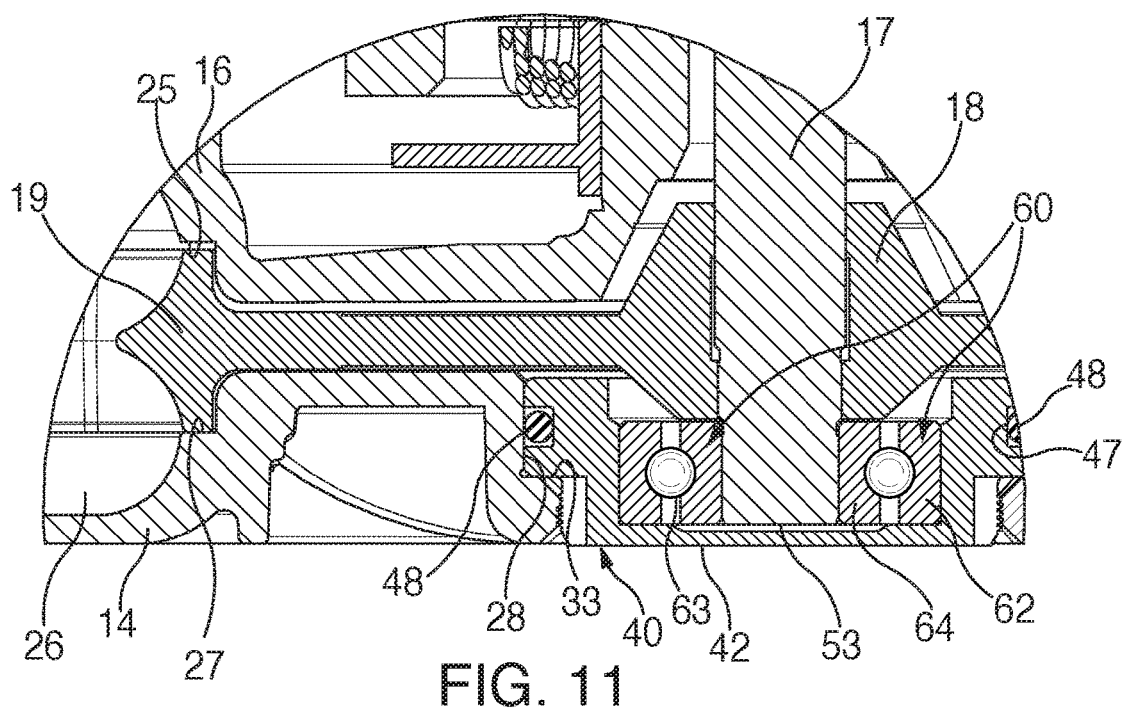
FIG. 11 is an enlarged, fragmentarily-illustrated, sectional view of the side channel blower shown in FIG. 9, but showing the impeller at its lowest adjustable axial height.
Figure 12:
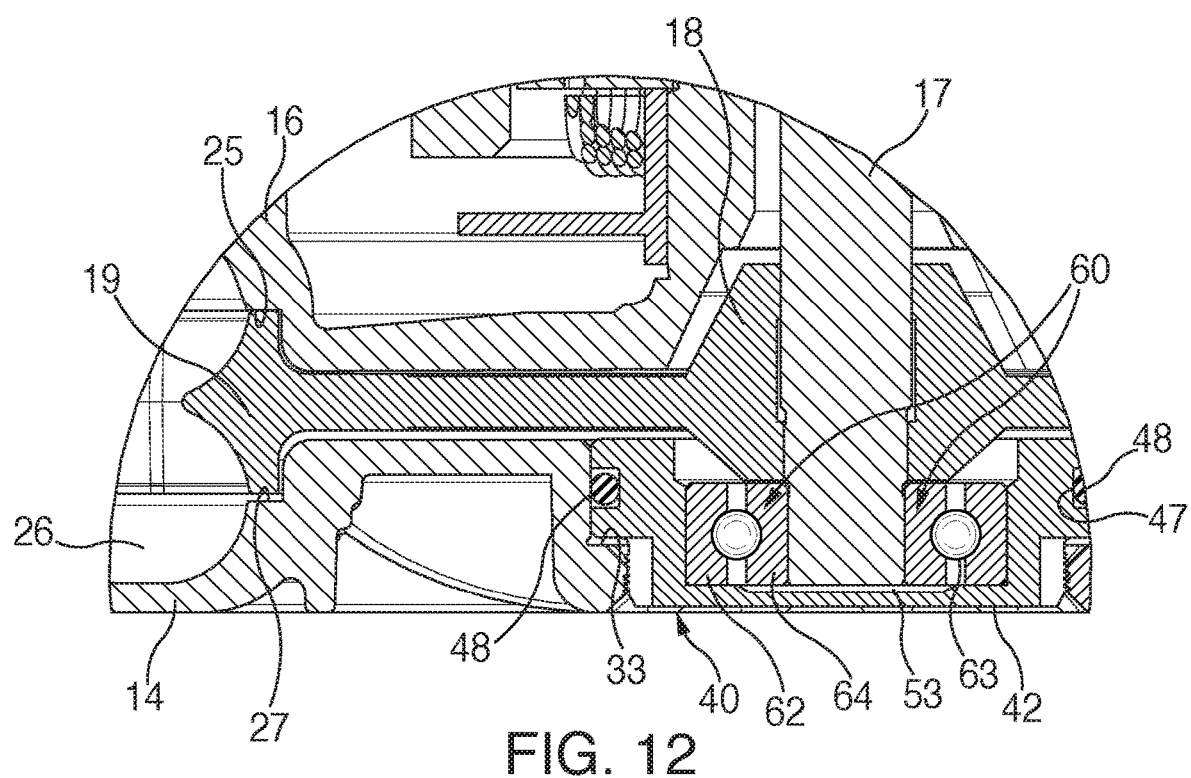
FIG. 12 is an enlarged, fragmentarily-illustrated sectional view of the side channel blower shown in FIG. 9 but showing the impeller at its highest adjustable axial height.

As best seen in FIGS. 11 and 12, as a result of the foregoing structure, the bearing assembly clearances with the fixed parts can be manually adjusted. More particularly, FIG. 11 shows the bearing assembly 40 at its axial highest depth position relative to the outer surface of outer casing 14 whereby it moves the outer free end of the impeller 19 to its uppermost position wherein it strikes the adjoining inner surface 27 of the outer case 14 therebelow. On the other hand, FIG. 12 shows the enlarged channeled portion 46 of the bearing housing 40 raised off outer housing seat 33 whereby it moves the outer free end of the impeller 19 to its lowermost position where it contacts the adjoining surface 27 of the inner casing 16 thereabove. Consequently, during assembly, the appropriate axial position of the bearing housing is in a range between these two unacceptable end points of travel. Once determined and as shown in FIGS. 10A and 10B, the cylindrical locking pins 52 are inserted into the combined half holes 49, 50 and preferably sealed in position by adhesive to lock in place the optimally desired radial and axial position of the bearing housing 40.

This degree of travel allows for an independent adjustment of the distance between the impeller's blades 31 and the housing 12. As the distance does not rely on the machined tolerances and the assembly tolerances, the assembly can be easily adjusted to meet the performances and quality requirements in a simpler manner. As the bearing housing 40 is inserted and screwed inside the outer casing element 14, the tight axial tolerances of the bearing housing assembly becomes the most important and controlling design parameter.

It is to be understood that the above-mentioned figures are only illustrative of the application of the principles of the present disclosure. Numerous modifications or alternative arrangements may be devised by those skilled in the art without departing from the spirit and scope of the present disclosure. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

For instance, the materials, configuration, dimensions and types of the blower and bearing housing assemblies shown above, and their parts, can be modified or substituted for one another, for particular applications when so needed or desired.

It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily superior" and "inferior".

Accordingly, it is to be understood that the embodiment of the invention herein described is merely illustrative of the application of the principles of the invention. While a particular embodiment of the invention have been described, it is not intended that the invention be limited thereto, as it is intended that the invention be as broad in scope as the prior art will allow and that the specification be read likewise.

What is claimed is:

1. A bearing housing and bearing subassembly for use in a regenerative side channel blower of the type having a blower housing having an internal cavity formed therein defining a toroidal flow channel for a fluid, an impeller having blades rotatably mounted in said internal cavity of said blower housing, and a drive shaft rotatably mounted in said blower housing on which said impeller is mounted for rotation therewith about a longitudinal axis of said drive shaft, said blower housing further comprising an outer casing, and an inner casing removably coupled to one another, which together cooperatively define the internal cavity of the blower housing, and with the outer casing thereof having a cylindrical rim defining a central circular opening extending through the outer casing, and wherein the cylindrical rim has a threaded portion formed thereon, the bearing housing and bearing subassembly comprising:

a bearing housing and a bearing mounted in said bearing housing for axially supporting said impeller in an adjustable manner, said bearing housing being adjustably mountable in the blower housing of the regenerative side channel blower to allow for an axial depth adjustment of the position of the impeller relative to the blower housing to, in turn, adjust the clearance between the impeller and the blower housing, wherein said bearing housing has a threaded portion rotatably and threadably engageable with the threaded portion of the blower housing to allow for said axial depth adjustment via rotational adjustment of said threaded portion of said bearing housing relative to the threaded portion of the blower housing;

wherein said bearing housing is generally cup-shaped and has a closed end defining a basewall and an opposite open end, and a generally cylindrical sidewall having a first end secured to said basewall and a second end defining said open end, said sidewall having an outer surface with said threaded portion of said bearing housing being formed thereon adjacent to said basewall thereof; and wherein said bearing housing is mountable on the outer casing of the regenerative side channel blower via said threaded portion thereof being threadably engageable with the threaded portion of the cylindrical rim of the outer casing of the blower housing.

2. The bearing housing and bearing subassembly according to claim 1, wherein said regenerative side channel blower is of the further type wherein a plurality of spaced-apart, semi-circular cut-outs are formed in the threaded portion of the outer casing cylindrical rim, and wherein said bearing housing has a plurality of spaced-apart, semicircular cut-outs in said threaded portion formed therein which are alignable with the cut-outs of the blower housing cylindrical rim so together they form a plurality of cylindrical slots.

3. The bearing housing and bearing subassembly according to claim 2, additionally included a plurality of cylindrical locking pins, each insertable into one of said cylindrical slots to fix the radial and longitudinal axial position of said bearing housing in the outer casing of the blower housing.

4. The bearing housing and bearing subassembly according to claim 3, wherein the regenerative side channel blower is of the further type wherein the cut-outs in the cylindrical rim are equidistantly spaced about the circumference of the cylindrical rim of the blower housing and wherein said cut-outs of said bearing housing are equidistantly spaced about said threaded portion of said bearing housing to effect alignment of said cut-outs of said bearing housing with the blower housing cut-outs.

5. The bearing housing and bearing subassembly according to claim 1, wherein said bearing housing sidewall has a circumferentially-extending, generally U-shaped channel opening onto said outer surface thereof formed adjacent to, but spaced from, said threaded portion thereof.

6. The bearing housing and bearing subassembly according to claim 5, additionally including an O-ring received in said U-shaped channel of said bearing housing sidewall.

7. The bearing housing and bearing subassembly according to claim 1, wherein said bearing is a roller bearing disposed within said cup-shaped bearing housing adjacent to said basewall thereof, said bearing has having a cylindrical outer race and a cylindrical inner race, said inner race being couplable to the drive shaft for rotation therewith and said outer race being coupled to said bearing housing.

8. A regenerative side channel blower comprising:

a blower housing having an internal cavity formed therein defining a toroidal flow channel for a fluid, said blower housing further comprising an outer casing and an inner casing removably coupled to one another which together cooperatively define said internal cavity of said blower housing, and said outer casing having a cylindrical rim defining a central circular opening extending through said outer casing, an impeller having blades rotatably mounted in said internal cavity of said blower housing;

a drive shaft rotatably mounted in said blower housing on which said impeller is mounted for rotation therewith about a longitudinal axis of said drive shaft;

a bearing housing and bearing subassembly for axially supporting said impeller in an adjustable manner comprising a bearing housing and a bearing mounted in said bearing housing, said bearing housing being adjustably mounted in said blower housing to allow for an axial depth adjustment of the position of the impeller to, in turn, adjust the clearance between the impeller and the blower housing;

wherein said blower housing and said bearing housing each have a threaded portion rotatably engageable with one another to allow for said axial depth adjustment via rotational adjustment of said threaded portions relative to one another; said cylindrical rim of said blower housing having said threaded portion of said blower housing formed thereon; and wherein said bearing housing is generally cup-shaped and has a closed end and an opposite open end, and a cylindrical sidewall having a first end secured to said closed end and a second end defining said opposite open end of said bearing housing, said sidewall having an outer surface with said threaded portion of said bearing housing being formed thereon adjacent to said closed end thereof.

9. The blower according to claim 8, wherein said bearing housing sidewall has a plurality of spaced-apart, semicircular, cut-outs formed in said threaded portion thereof and wherein and said outer casing cylindrical rim has a plurality of spaced-apart, semi-circular cut-outs formed in said threaded portion thereof which are aligned with said cut-outs of said bearing housing sidewall so together they collectively form cylindrical slots.

10. The blower according to claim 9, additionally included a plurality of cylindrical locking pins, each inserted into one of said cylindrical slots to fix the radial and longitudinal axial position of said bearing housing in said outer casing.

11. The blower according to claim 10, wherein said cut-outs are equidistantly spaced about the circumference of said cylindrical sidewall of said bearing housing and said cylindrical rim of said outer casing to permit alignment of said cut-outs thereof.

12. The blower according to claim 8, wherein said bearing housing sidewall has a circumferentially-extending, generally U-shaped channel opening onto said outer surface thereof formed adjacent to, but spaced from, said threaded portion thereof.

13. The blower according to claim 12, additionally including an O-ring received in said channel of said bearing housing sidewall.

14. The blower according to claim 8, wherein said bearing is disposed within said cup-shaped bearing housing adjacent to a basewall defined at said closed end thereof and has a cylindrical outer ring and inner ring, said inner ring being coupled to said shaft for rotation therewith and said outer ring being coupled to said bearing housing.

* * * * *